A. FAULS.
TRAP.
APPLICATION FILED NOV. 30, 1910.
988,259.
Patented Mar. 28, 1911.
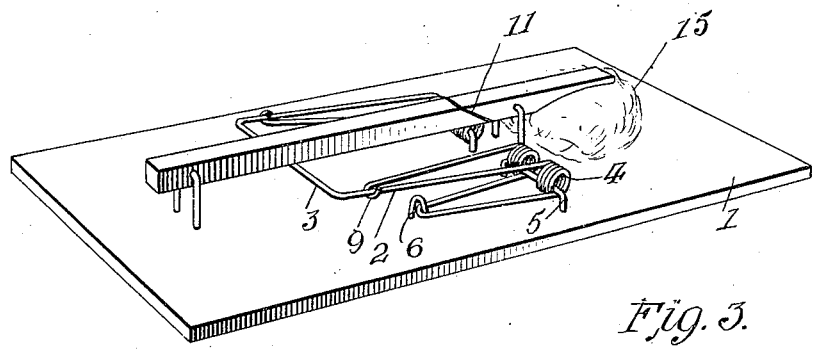
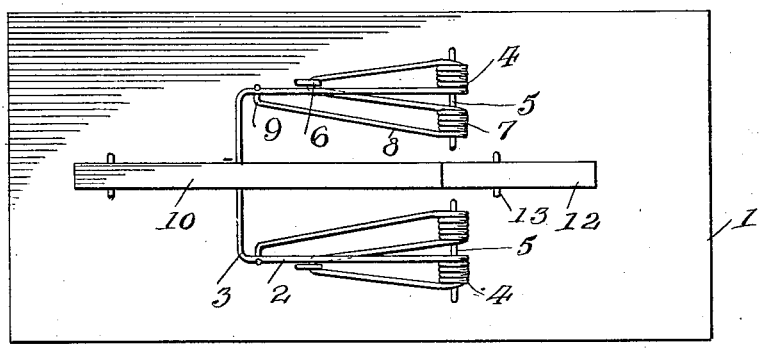
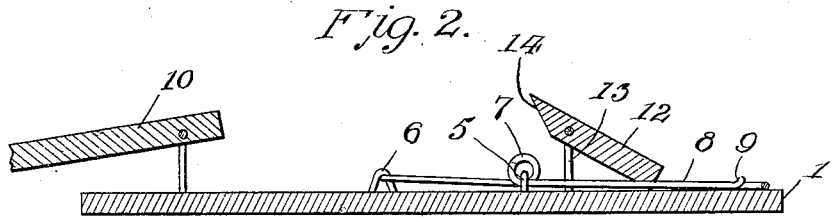
Inventor
Andrew Fauls.
Witnesses
William Smith.
By Victor J. Evans
Attorney

UNITED STATES PATENT OFFICE.

ANDREW FAULS, OF SOUTHPORT, CONNECTICUT.

TRAP.

988,259. Specification of Letters Patent. Patented Mar. 28, 1911.

Application filed November 30, 1910. Serial No. 594,865.

*To all whom it may concern:*

Be it known that I, ANDREW FAULS, a citizen of the United States, residing at Southport, in the county of Fairfield and State of Connecticut, have invented new and useful Improvements in Traps, of which the following is a specification.

This invention relates to animal traps and the object of the invention is to provide a spring trap which is of an extremely simple construction, employing but few parts and which will perform the functions for which it is intended with accuracy and certainty.

With the above and other objects in view which will appear as the nature of the invention progresses, the invention resides in the novel construction and combination of parts hereinafter fully described and claimed.

In the drawings, Figure 1 is a perspective view of a trap constructed in accordance with this invention and shown set. Fig. 2 is a central longitudinal sectional view of the same. Fig. 3 is a top plan view, the trap being sprung.

Like numerals of reference indicate corresponding parts throughout the several figures of the drawings.

The numeral 1 designates the base of the trap upon which is mounted a spring actuated jaw 2. The jaw 2 has its upper portion looped as indicated by the numeral 3 and the lower arms provided by the said loop are formed with a plurality of convolutions 4, the said convolutions adapted to be engaged by suitable staples 5. The end convolutions are brought rearwardly and are adapted to engage an eye 6 which is positioned upon the base 1. The strand of wire forming the jaw is then brought forwardly and bent to provide further convolutions 7, the same being positioned upon the staple 5, and the end convolution is formed with an arm 8, the latter having its extremity curved as at 9 to engage the side arm of the spring jaw. It is to be understood that the sides of the loop 3 forming the spring jaw 2 are each of a light formation and it will be noted that by providing the additional convolutions 7 and the arms 8 engaging the sides of the loop 3, the jaw is given an additional spring power so that the same is rendered exceedingly sensitive which materially adds to the efficiency of the jaw in catching the animal, as will be presently described.

Pivotally connected with the base adjacent one of its ends is a locking bar 10. This locking bar is of a sufficient length to contact the spring jaw 2 when in its lowered or set position, and the end of the said bar is beveled or inclined downwardly as at 11.

The numeral 12 designates the coacting or second locking bar of the trap. This bar 12 is pivotally mounted within a staple 13, the said staple being positioned between the staples 5 carrying the convolutions of the jaw 2 and the inner face of the said locking bar is inclined or beveled as at 14 in an opposite direction to the beveled face of the locking member 10. The said beveled portions of each of the bars are adapted one to overlie the other, so as to form engaging lips. In order to retain the engaging lips of the locking bars in engagement with each other, and consequently retain the spring jaw 2 in its set position, a bait 15 is placed between the outer extremity of the bar 12 and the base 1. By this arrangement it will be noted that the trap is effectively set and it will be further noted that when an animal attempts to remove the bait or to tamper therewith, the bar 12 will be relieved from engagement with the spring jaw contacting the locking bar 10 so as to allow the said spring jaw to swing free of the said bar 10 and to strike the animal attempting to remove the bait.

From the above description taken in connection with the accompanying drawings, it will be noted that I have constructed a simple, cheap and thoroughly effective animal trap and while I have illustrated and described the preferred embodiment of the improvement as it now appears to me, minor changes within the scope of the following claim may be made if desired.

Having thus fully described the invention, what I claim as new, is:—

The combination with a base, of a spring jaw upon the base, said spring jaw comprising a loop, the lower arms of the loop being each formed with a plurality of convolutions, staples engaging the said convolutions, the end convolutions being extended upon the base, an eye engaging each of said extensions, the strand being continued from the eye and provided with a plurality of convolutions also engaging the staples and the end of each of these convolutions being formed with arms adapted to engage the side arms of the loop, a locking member for sustaining the loop in its set position, said locking member comprising a pair of sections, one of said sections being longer than the other and pivotally connected with the base, the said sections adapted to overlie the loop when the latter is in its set position, the second or shorter section being also pivotally connected with the base and adapted to contact and engage the longer section when the bait is positioned between the free end of the said shorter section and the base of the trap.

In testimony whereof I affix my signature in presence of two witnesses.

ANDREW FAULS.

Witnesses:
HENRY H. PERRY,
NELLIE J. DOYLE.

Copies of this patent may be obtained for five cents each, by addressing the "Commissioner of Patents, Washington, D. C."